United States Patent Office 3,773,797
Patented Nov. 20, 1973

---

3,773,797
Madhukar Subraya Chodnekar, Basel, Albert Pfiffner, Pfaffhausen, Norbert Rigassi, Arlesheim, Ulrich Schwieter, Reinach, and Milos Suchy, Basel, Switzerland, assignors to Hoffmann-La Roche Inc., Nutley, N.J.
No Drawing. Continuation-in-part of abandoned application Ser. No. 23,984, Mar. 30, 1970. This application Oct. 29, 1970, Ser. No. 85,302
Claims priority, appplication Switzerland, Aug. 5, 1969, 11,849/69
Int. Cl. C07d 1/18
U.S. Cl. 260—348 R        6 Claims

ABSTRACT OF THE DISCLOSURE

Propargyl alkyl or alkenyl ethers and esters, the alkyl or alkenyl radical contains a chain of from 6 to 13 carbon atoms and the double bonds in the alkenyl group can be epoxidized, hydrohalogenated or episulfidized, useful in killing and preventing the proliferation of insects by upsetting their hormone balance.

CROSS REFERENCE TO RELATED APPLICATIONS

This application is a continuation-in-part of U.S. patent application Ser. No. 23,984, filed Mar. 30, 1970, and now abandoned.

SUMMARY OF THE INVENTION

In accordance with this invention, it has been found that compounds of the formula:

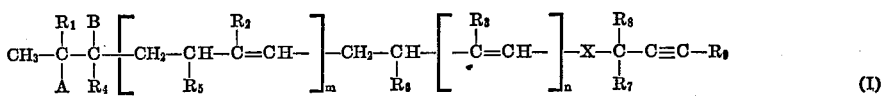

wherein $R_1$ is methyl or ethyl; $R_2$ and $R_3$ are hydrogen, methyl or ethyl; $R_4$ is hydrogen or methyl; $R_5$ and $R_6$ are hydrogen or lower alkyl; $R_7$ and $R_8$ are hydrogen, methyl or ethyl; $R_9$ is hydrogen, lower alkyl, lower alkenyl, lower alkynyl or aryloxy-lower alkyl; X is

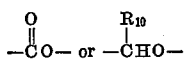

$R_{10}$ is hydrogen, methyl or ethyl; A individually is hydroxyl; B individually is chloro, bromo or iodo; and A and B taken together form a carbon to carbon bond, an oxygen or sulfur bridge; and $m$ and $n$ are integers of from 0 to 1;

upset the hormone balance of pests such as insects to prevent them from growing and reproducing.

The compounds of Formula I are prepared through the reaction of a compound of the formula:

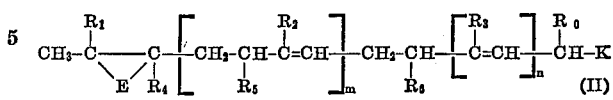

with a compound of the formula:

wherein $R_1$, $R_2$, $R_3$, $R_4$, $R_5$, $R_6$, $R_7$, $R_8$, $R_9$, $R_{10}$, $m$ and $n$ are as above; E is a carbon to carbon bond, a sulfur bridge or an oxygen bridge; and one of J and K is chloro, bromo or iodo and the other is hydroxy;

to produce a compound of the formula:

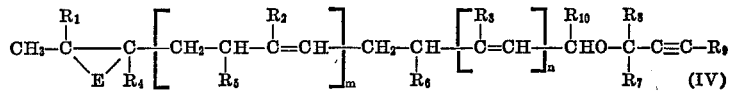

wherein $R_1$, $R_2$, $R_3$, $R_4$, $R_5$, $R_6$, $R_7$, $R_8$, $R_9$, $R_{10}$, E, $m$ and $n$ are as above;

or through the reaction of a compound of the formula:

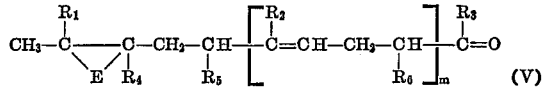

wherein $R_1$, $R_2$, $R_3$, $R_4$, $R_5$, $R_6$, E and $m$ is as above;

with a compound of the formula:

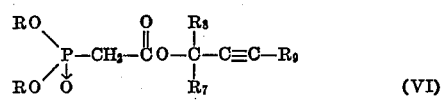

wherein $R_7$, $R_8$ and $R_9$ are as above; and R is lower alkyl, phenyl lower alkyl, halophenylloweralkyl and lower alkoxyphenylloweralkyl;
to produce a compound of the formula:

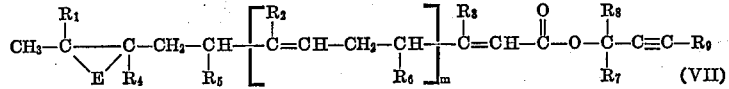

wherein $R_1$, $R_2$, $R_3$, $R_4$, $R_5$, $R_6$, $R_7$, $R_8$, $R_9$, E and $m$ are as above.

In accordance with this invention, a compound of the formula:

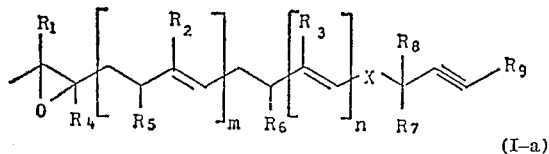

(I-a)

wherein $R_1$, $R_2$, $R_3$, $R_4$, $R_5$, $R_6$, $R_7$, $R_8$, $R_9$, X, $m$ and $n$ are as above;

can be produced by epoxidizing a compound of the formula:

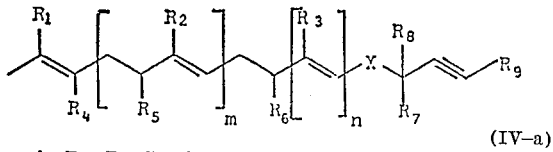

(IV-a)

wherein $R_1$, $R_2$, $R_3$, $R_4$, $R_5$, $R_6$, $R_7$, $R_8$, $R_9$, X, $m$ and $n$ are as above.

In accordance with this invention, a compound of the formula:

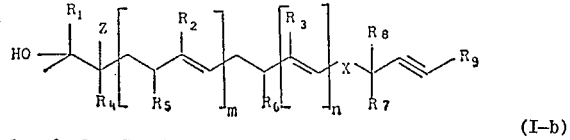

(I-b)

wherein $R_1$, $R_2$, $R_3$, $R_4$, $R_5$, $R_6$, $R_7$, $R_8$, $R_9$, X, $m$ and $n$ are as above; and Z is chlorine, bromine or iodine;

can be prepared by hydroxyhalogenating the compound of the Formula IV-a above.

In accordance with this invention, a compound of the formula:

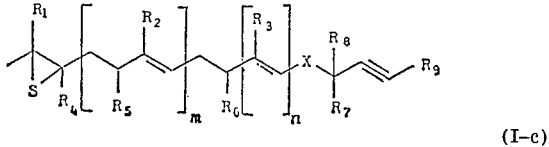

(I-c)

wherein $R_1$, $R_2$, $R_3$, $R_4$, $R_5$, $R_6$, $R_7$, $R_8$, $R_9$, X, $m$ and $n$ are as above;

can be prepared by episulfidizing the compound of the Formula I-a, or a compound of the Formula I-b.

In accordance with another embodiment of the invention, a compound of the Formula I-a above can be prepared by transforming a compound of the Formula I-b into an epoxide.

DETAILED DESCRIPTION OF THE INVENTION

The term "halogen" as used throughout this application, includes all four halogens, i.e., bromine, chlorine, fluorine and iodine. As used throughout this application, the term "lower alkyl" comprehends both straight and branched chain saturated hydrocarbon groups containing from 1 to 6 carbon atoms, such as methyl, ethyl, propyl, isopropyl, etc. The term "lower alkoxy" comprehends lower alkoxy groups containing from 1 to 6 carbon atoms such as methoxy, propoxy, ethoxy, etc. The term "lower alkenyl" as used herein, includes both straight and branched chain unsaturated hydrocarbon groups having from 2 to 6 carbon atoms such as allyl, methyl-allyl, and the like. The term "lower alkynyl" as used herein includes both straight and branched chain, acetylenic unsaturated hydrocarbon having from 2 to 6 carbon atoms such as ethynyl, propargyl, butynyl, etc.

The term "aryl," as used throughout the application, includes mono-nuclear aryl groups such as phenyl which can be unsubstituted or substituted in 1 or more positions with a hydroxy, lower alkylenedioxy, halogen, nitro, lower alkyl, lower alkoxy, lower alkynyl, lower alkynyloxy, lower alkenyl or lower alkenyloxy substituent, and polynuclear aryl groups such as naphthyl, anthryl, phenanthryl, azulyl, etc. which may be substituted with 1 or more of the aforementioned groups. The term "aryloxyloweralkyl" comprehends aryloxyloweralkyl groups wherein aryl is defined as above and the alkyl is lower alkyl. The preferred aryloxyloweralkyl group is phenyloxymethyl.

The term "lower alkenyloxy" as utilized herein includes lower alkenyloxy groups wherein lower alkenyl is defined as above. Among the preferred lower alkenyloxy groups are included vinyloxy, allyloxy, butenyloxy and pentenyloxy. The term "alkynyloxy" as defined herein includes the lower alkynyloxy groups wherein lower alkynyl is defined as above. Among the preferred alkenyloxycarbonyl groups are included ethynyloxy, propargyloxy, etc.

The term "lower alkylenedioxy" includes lower alkylenedioxy groups containing from 1 to 6 carbon atoms such as methylenedioxy, ethylenedioxy, etc.

The compound of Formula I are useful in the control of pests such as Tineola biselliella (clothes moth), Ephestia kuniella (flour moth), Dysdercus cingulatus (cotton bug), etc.

In contrast to most of the known pest-control agents which kill, disable or repel the pests by acting as contact-poisons and feed-poisons, the compound of Formula I above prevent maturation and proliferation of these pests by interfering with their hormonal system. In insects, for example, the formation into the image is disturbed. Furthermore, the sequence of generations is interrupted and the insects are indirectly killed.

The compounds of Formula I above are practically non-toxic to vertebrates. The toxicity of these compounds is greater than 1,000 mg./kg. body weight. Moreover, these compounds are readily degraded and the risk of accumulation is therefore excluded. Therefore, these compounds can be used without fear of danger in the control of pests in animals; plants; foods; and textiles.

Generally, in controlling invertebrate animals, the compounds of Formula I above thereof are applied to the material to be protected, e.g., foodstuffs, feeds, textiles, plants in concentrations of from about $10^{-3}$ to $10^{-6}$ gm./cm.$^2$ of the material to be protected. Generally, it is preferred to utilize the compounds of Formula I above in a composition with a suitable inert carrier. Any conventional inert carrier can be utilized.

The compound of Formula I can, for example, be used in the form of emulsions, suspensions, dusting agents, solutions or aerosols. In special cases, the materials to be protected (e.g., foodstuffs, seeds, textiles and the like) can also be directly impregnated with the appropriate compound or with a solution thereof. Moreover, the compounds can also be used in a form which only releases them by the action of external influences (e.g., contact with moisture) or in the animal body itself.

The compound of Formula I above can be used as solutions suitable for spraying on the material to be protected which can be prepared by dissolving or dispersing these compounds in a solvent such as mineral oil fraction; cold tar oils; oils of vegetable or animal origins; hydrocarbons such as naphthalenes; ketones such as methyl ethyl ketone; or chlorinated hydrocarbons such as tetrachloroethylene, tetrachlorobenzene, and the like. The compounds of Formula I above can also be prepared in forms suitable for dilution with water to form aqueous liquids such as, for example, emulsion concentrates, pastes or powders. The compounds of Formula I above can be combined with solid carriers for making dusting or strewing powders as, for example, talc, kaolin, bentonite, calcium carbonate, calcium phosphate, etc. The compositions containing the compound of Formula I above can contain, if desired, emulsifiers, dispersing agents, wetting agents, or other active substances such as fungicides, bacteriacides, nematocides, fertilizers and the like. These materials which are to be protected act as bait for the insect. In this manner, the insect, by contacting the material impregnated with the compound of Formula I above, also contacts the compound of Formula I above.

In accordance with this invention, when one or more of $R_7$, $R_8$, and $R_9$, in the compound of Formula I are aryloxyloweralkyl groups, the aryl group such as phenyl in the aryloxyloweralkyl group such as phenyloxymethyl can be unsubstituted or substituted with halogen, lower alkyl, lower alkenyl, lower alkynyl, lower alkyloxy, lower alkenyloxy, lower alkynyloxy, lower alkylenedioxy or nitro. Among the preferred substituents which can be substituted on the aryl moiety when $R_7$, $R_8$, or $R_9$ is an aryloxyalkyl radical are halogen, nitro, lower alkyl or lower alkoxy.

In accordance with a preferred embodiment, $R_9$, in the compound of Formula I is lower alkyl, particularly methyl.

Among the preferred compounds of Formula I above are those where $R_1$ is methyl or ethyl; $R_2$ and $R_3$ are hydrogen, methyl or ethyl; $R_4$ is hydrogen or methyl; $R_5$ and $R_6$ are hydrogn or lower alkyl; $R_7$ and $R_8$ are hydrogen, methyl or ethyl; $R_9$ is hydrogen, lower alkyl, lower alkenyl, lower alkynyl or aryloxyloweralkyl; with the aryl residues in the substituent $R_9$ unsubstituted or substituted with halogen, lower alkyl, lower alkyloxy or nitro groups; and X is methyleneoxy which can be unsubstituted or in which the methylene group may contain a methyl or ethyl group, or carbonyloxy; A individually is a hydroxyl group, B individually is chlorine, bromine or iodine; or A and B taken together form an oxygen or a sulfur bridge; and $m$ and $n$ represent the number 0 or 1. Particularly preferred are compounds of the general Formula I, wherein $R_1$ is methyl or ethyl; $R_2$ and $R_3$ are hydrogen, methyl or ethyl; $R_4$ is hydrogen or methyl; $R_5$ and $R_6$ are hydrogen, methyl or ethyl; $R_7$ and $R_8$ are hydrogen or methyl; $R_9$ is hydrogen, lower alkyl, lower alkenyl, lower alkynyl, or an aryloxymethyl group which can be unsubstituted or substituted with halogen, nitro, lower alkyl or lower alkyloxy; X is unsubstituted methyleneoxy or a methyleneoxy group in which the methylene group may have a methyl or ethyl radical, or a carbonyloxy group; A individually is hydroxyl; B individually is chlorine, bromine or iodine; or A and B taken together form an oxygen or sulfur bridge; and $m$ and $n$ represent the number 0 or 1.

Among the most preferred compounds of Formula I above are included:

2,3-epoxy-2-methyl-6-(2-propynyloxy)-heptane;
6,7-epoxy-3,7-dimethyl-1-(2-propynyloxy)-2-octene;
3-bromo-2,6,10-trimethyl-12-(2-propynyloxy)-6,10-dodecadiene-2-ol;
10,11-epoxy-3,7,11-trimethyl-1-(2-propynyloxy)-2,6-dodecadiene;
10,11-epoxy-3,7,11-trimethyl-1-(2-propynyloxy)-2,6-tridecadiene;
10,11-epoxy-3,7,10,11-tetramethyl-1-(2-propynyloxy)-2,6-dodecadiene;
10,11-epoxy-3,7,11-trimethyl-2,6-dodecadienoic acid-2-propynyl ester;
10,11-epoxy-7-ethyl-3,11-dimethyl-2,6-tridecadienoic acid-2-propynyl ester;
6,7-epoxy-3,7-dimethyl-2-octaenoic acid-2-propynyl ester;
6,7-epoxy-3,7-dimethyl-2-octenoic acid-2-propynyl oxy)-2-octene;
6,7-epithio-3,7-dimethyl-2-octenoic acid-2-propynyl ester;
10,11-epoxy-3,7,11-trimethyl-1-(4-phenoxy-2-butinyl)-2,6-dodecadiene; and
6,7-epoxy-3,7-dimethyl-2-octenoic acid (4-phenoxy-2-butinyl)ester.

Among the starting materials which can be utilized to prepare the compounds of Formula I are included:

(1,5-dimethyl-4-hexenyl)-2-propynyl ether;
(3,7-dimethyl-2,6-octadienyl)-2-propynyl ether;
2-propynyl-(3,7,11-trimethyl-2,6,10-dodecatrienyl)-ether;
3,7,11-trimethyl-2,6,10-dodecatrienoic acid-2-propynyl ester;
7-ethyl-3,11-dimethyl-2,6,10-tridecatrienoic acid-2-propynyl ester;
(3,7-dimethyl-2,6-octadienyl)1-(1,1-dimethyl-2-propynyl) ether;
3,7,11-trimethyl-2,6,10-dodecatrienoic acid (6-methyl-5-hepten-2-inyl)ester;
3,7-dimethyl-2,6-octadienyl 2,4-hexadienyl ether;
3,7,11-trimethyl-2,6,10-dodecatrienyl(4-phenoxy-2-butinyl) ether; and
3,7-dimethyl-2,6-octadienoic acid (4-phenoxy-2-butinyl) ester.

The compound of the Formula IV is prepared by reacting a compound of the Formula III with a compound of the Formula II. This reaction is carried out in the presence of an inert organic solvent. In carrying out this reaction, any conventional inert organic solvent can be utilized such as benzene, toluene, dioxan, 1,2-dimethoxyethane. Generally, it is preferred to carry out this reaction utilizing an inert organic solvent such as tetrahydrofuran and an aprotic solvent. Any conventional aprotic solvent, preferably hexamethylphosphoric acid triamide can be utilized. In carrying out this reaction, temperature and pressure are not critical, and any temperature of from 0° C. to the reflux temperature of the reaction medium can be utilized. Generally, a reaction temperature of 70° C. is preferred since the reaction components dissolved in tetrahydrofuran will reflux under these conditions. In carrying out this reaction, the hydroxyl group of either J or K is converted to its alkali metal salt. The conversion of the alcohol to the corresponding alkali metal salt can be carried out by conventional procedures well known in the art. In accordance with a preferred embodiment, the compound of Formula II or III, where either J or K is a hydroxyl group, is reacted with a suitable base or alkali metal such as sodium hydride, potassium t-butylate, utilizing tetrahydrofuran as the solvent. This alkali metal salt is then reacted with the halide of either compound II or compound III to prepare the compound of the Formula IV.

If it is desired to prepare a compound of the Formula IV-a, wherein X is

the compound of Formula II wherein E is a carbon to carbon bond and K is a bromo atom is reacted with a compound of the Formula III where J is a hydroxyl group in the form of its alkali metal salt. This reaction is carried out in the same manner as described hereinabove with respect to reacting compounds of the Formula II with compounds of the Formula III to produce a compound of the Formula IV above. Generally, it is preferred to carry out this reaction in an inert organic solvent such as benzene, toluene, dioxan, 1,2-dimethoxyethane or tetrahydrofuran. Generally, it is preferred to add an aprotic solvent, preferably hexamethylphosphoric acid triamide. Generally, it is preferred to carry out this reaction at a temperature of from 0° C. to the boiling point of the respective solvent.

The compound of Formula VII is prepared by reacting the compound of the Formula V with a phosphine oxide of the Formula VI. This reaction can be carried out in the presence of a base in an inert organic solvent medium. Any conventional base such as an alkali metal hydride which includes sodium hydride, etc.; or alkali metal alcoholate such as sodium methylate can be utilized in carrying out this reaction. Furthermore, in carrying out this reaction, any conventional inert organic solvent can be utilized. If sodium hydride is utilized as the base, solvents such as benzene, toluene, dimethylformamide, tetrahydrofuran, dioxan or 1,2-methoxyethane are preferred. If this reaction is carried out in the presence of an alkali metal alcoholate such as sodium methylate, alcohol solvents such as methanol are preferred. In carrying out this reaction, temperature and pressure are not critical and this reaction can be carried out at room temperature and atmospheric pressure. Generally, it is preferred to carry out this reaction at a temperature of from about 0° C. to about 40° C. In a particularly preferred embodiment, the compound of Formula V is reacted with a compound of Formula VI in the presence of 2 moles of sodium hydride in absolute tetrahydrofuran. The excess sodium hydride can be destroyed by the addition of an absolute alkanol before further processing.

The compounds of Formula IV-a wherein X is

is prepared by reacting a compound of the Formula V wherein E is a carbon to carbon bond with a compound of the Formula VI. The same conditions described in connection with the formation of a compound of the Formula VII can be utilized in this procedure. Therefore, this reaction is suitably carried out in the presence of a base and in an inert organic solvent medium. For example, this reaction can be carried out in the presence of sodium hydride in a solvent such as benzene, toluene, dimethylformamide, tetrahydrofuran, dioxan, or 1,2-dimethoxyethane. Alternatively, this reaction can be carried out in the presence of an alkali metal alcoholate in an alkanol solvent such as in the presence of sodium methylate in methanol. Generally, this reaction is carried out at a temperature of from 0° C. to 40° C.

In accordance with another embodiment of this invention, the compound of the Formula IV-a is prepared by the esterification of an acid of the formula:

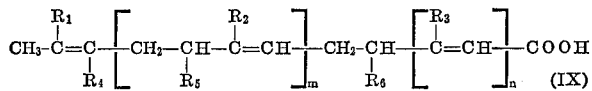

wherein $R_1$, $R_2$, $R_3$, $R_4$, $R_5$, $R_6$, $m$ and $n$ are as above;

with a compound of the Formula III wherein J is a hydroxyl group. Any of the conventional methods of esterifying an acid with an alcohol can be utilized in carrying out this reaction. In accordance with a preferred embodiment of this invention, the acid of Formula IX is reacted with a halogenating agent such as thionylchloride, thionylbromide, phosphorus trichloride, phosphorus oxychloride, etc. The preferred halogenating agent is thionylchloride. The halogenation of the acid of Formula IX is carried out in the presence of an inert organic solvent such as petroleum ether, benzene, hexane, etc. This halogenation reaction is carried out in the presence of an organic amine base. Any of the conventional organic amine bases such as pyridine, trimethylamine, quinoline, etc. can be utilized in this reaction. The preferred organic amine base for utilization in this halogenation reaction is pyridine. The resulting acid halide can then be reacted by conventional means with the alcohol of Formula III to produce the compound of Formula IV-a wherein X is

Generally, this reaction is carried out in an inert organic solvent such as benzene, toluene, hexane, isooctane, chloroform, carbon tetrachloride or ethyleneglycoldimethylether. This reaction is also carried out in the presence of an organic amine base such as pyridine, triethylamine, quinoline with pyridine being preferred.

The compound of Formula IV-a above can be epoxidized to the compound of Formula I-a by any conventional epoxidization procedure. Generally, this reaction is carried out by dissolving the compound of Formula IV-a in an inert organic solvent and treating this solution with a peracid. In carrying out this reaction, any conventional inert organic solvent, particularly the halogenated hydrocarbon solvents such as chloroform or carbon tetrachloride can be utilized. Generally, the preferred solvent in this reaction is methylene chloride. Any conventional peracid can be utilized in carrying out the epoxidization reaction. Among the conventional peracids which can be utilized are included: performic acid, peracetic acid, perbenzoic acid, perphthalic acid.

In carrying out the epoxidization reaction, m-chloroperbenzoic acid is the preferred peracid. In carrying out this reaction, temperature and pressure are not critical and this reaction can be carried out at a temperature of from 0° C. to 40° C.

The compound of Formula I-b is prepared by hydroxyhalogenating the compound of the Formula IV-a. This hydroxyhalogenation can be carried out by conventional procedures. In accordance with a preferred embodiment of this invention, the compound of Formula IV-a is suspended in water and treated with an equal amount of an inert organic solvent to form a homogenous concentrated solution. In accordance with this invention, any conventional inert organic solvent can be utilized. Among the conventional inert organic solvents which can be utilized are included: dioxan, 1,2-dimethoxyethane and tetrahydrofuran with tetrahydrofuran being preferred. This solution can be treated with a conventional hydroxyhalogenating agent to hydroxyhalogenate the compound of Formula IV-a. If it is desired to produce a compound of the Formula I-b wherein Z is bromine, N-bromosuccinimide is added to the solution at a temperature of from about 0° C. to 40° C. If it is desired to produce a compound of the Formula I-b where Z is chlorine or iodine, N-chlorosuccinimide or N-isodosuccinimide is utilized as the hydroxyhalogenating agent with temperatures of from 0 to 5° C.

The halohydrin of Formula I-b can be episulfidized to the compound of Formula I-c in a two-step process. In the first step, the halohydrin of Formula I-b is reacted with an episulfidizing agent to form the corresponding isothiouronium salt. The isothiouronium salt is then cleaved with a base to form the epithio compound of Formula I-c above.

The conversion of the halohydrin compound of Formula I-b above to the isothiouronium salt is carried out by utilizing an episulfidizing agent. Any conventional episulfidizing agent can be utilized in carrying out this reaction step. Among the conventional episulfidizing agents are included, thiocyanates such as ammonium thiocyanate; alkali metal thiocyanates such as sodium thiocyanate or potassium thiocyanate; thiourea; N-substituted thiourea such as thiobarbituric acid; thioamides or alkali metal thiosulfates, such as sodium thiosulfate. Of the episulfidizing agents, thiourea and alkali metal thiocyanates are preferred. Generally, in carrying out this reaction, at least one mole of the episulfidizing agent is present per mole of the halohydrin of Formula I-b. The formation of the isothiouronium salt from the halohydrin of Formula I-b above is generally carried out in the presence of an inert polar organic solvent. Any conventional polar organic solvent can be utilized. Among the conventional polar organic solvents which can be utilized in this conversion are included lower alkanols such as methanol. In carrying out this reaction, temperature and pressure are not critical and this reaction can be carried out at room temperature and atmospheric pressure. However, if desired, temperatures as high as the reflux temperature of the reaction mixture can be utilized.

The isothiouronium salt is cleaved to form the epithio compound of Formula I-b by treating the isothiouronium salt with a base. Any of the conventional bases such as those hereinbefore mentioned can be utilized. Among the conventional bases which can be utilized, alkali metal carbonates, such as sodium carbonate and potassium carbonate are preferred. Generally, these carbonates are added in the form of an aqueous solution. Generally, this cleavage of the isothiouronium salt is carried out in the solvent system which was utilized for its formation. Therefore, organic polar solvents such as methanol and ethanol are preferred. In carrying out this cleavage reaction, temperature and pressure are not critical and this reaction can be carried out at room temperature and atmospheric pressure. However, higher or lower temperatures can be utilized. Any temperature from about 0° C. to the reflux temperature of the reaction mixture can be utilized. However, temperatures of from 0° C. to 5° C. are generally preferred.

The compound of Formula I–a containing epoxy groups in its aliphatic side chain can be converted to the corresponding epithio compound of Formula I–c above by episulfidization in two steps. In the first step, the epoxide of Formula I–a above is reacted with an episulfidizing agent in the presence of a mineral acid at a temperature of from 0° C. to 30° C. to form the isothiouronium salt. In the second step, the isothiouronium salt is cleaved to form the epithio compound by means of treatment with a base.

In the first step of this reaction, the epoxide of Formula I–a is reacted with an episulfidizing agent in the presence of a mineral acid at a temperature of from 0° C. to 30° C. Generally, it is preferred to utilize temperatures of from 0° C. to 5° C. in carrying out this reaction. Any conventional mineral acid can be utilized such as sulfuric acid, hydrochloric acid, etc. The preferred acid is an aqueous sulfuric acid such as 2 N aqueous sulfuric acid. Any conventional episulfidizing agent such as the episulfidizing agents mentioned hereinbefore can be utilized. Thiourea is the preferred episulfidizing agent. In carrying out this reaction, an inert organic solvent can be utilized. Any conventional inert organic solvent can be utilized. Among the inert organic solvents, dioxan is preferred. The isothiouronium salt thus formed can be converted into the compound of Formula I–c above in the manner hereinbefore described.

In accordance with another embodiment of this invention, the halohydrin of Formula I–b above can be converted to the epoxy compound of Formula I–A by treating the halohydrin with a base. The formation of the epoxide from the halohydrin is carried out at a temperature of from 0° C. to 30° C. Any of the conventional bases except alkali metals can be utilized. Among these bases, alkali metal hydroxides and alkali metal alcoholates such as sodium methylate, sodium ethylate, etc. are generally preferred in converting the halohydrin to the corresponding epoxy compound. This reaction is generally carried out in an inert organic solvent. In the case where X in the compound of Formula I–b is

the preferred inert organic solvent is ether and the preferred base is a pulverized alkali metal hydroxide, particularly sodium hydroxide. In the case where X in the compound of Formula I–b is

the preferred solvents are lower alkanols, particularly methanol and the preferred base is an alkali metal alcoholate, particularly sodium methylate.

The transformation of the halohydrin of Formula I–b to a compound of the Formula I–a has the advantage of solely obtaining an epoxide at the terminal double bonds of the esters and ethers of this invention. On the other hand when a compound of Formula IV–a is epoxized with a peracid, epoxidation may occur at one or more of the double bonds within the compound of Formula IV–a. Therefore, epoxidation of the compound of the Formula IV–a with a peracid produces a mixture of epoxides. These mixtures can be separated by conventional means such as chromatography.

The compounds of Formula I are obtained as cis/trans isomer mixtures. These mixtures can be separated into the individual isomers by conventional means such as adsorption on a material with selective activity. In this case, the isomer mixture is dissolved in an inert organic solvent, e.g., in hexane, ether or ethyl acetate or mixtures thereof, and adsorbed on silica gel. The isomers are adsorbed in different zones and can be eluated and isolated with an inert organic solvent or an inert organic solvent mixture. Any of the conventional inert organic solvents mentioned hereinbefore can be utilized to carry out this elution process. Other conventional methods whereby the isomers can be separated include fractional distillation, preparative gas chromatography or preparative thin-layer chromatography.

The following examples are illustrative but not limitative of this invention. All temperatures are in degrees centigrade. Nujol is mineral oil and the percent of hydride in the mineral oil suspension is given as percent by weight.

EXAMPLE 1

6.95 g. of (1,5-dimethyl-4-hexenyl)-2-propynyl ether are dissolved in 80 ml. methylene chloride and cooled to 0° (ice bath). Ten grams of an aqueous solution containing 79% by weight of m-chloroperbenzoic acid are added in portions to this mixture and the solution is stirred for 2 hours at 0° C. The mixture is processed further by diluting with 350 ml. of diethyl ether, washing with ice cold aqueous 1 N sodium hydroxide solution and subsequently with saturated aqueous sodium chloride solution, drying over sodium sulfate and evaporating. 2,3-epoxy-2-methyl-6-(2 - propynyloxy) heptane is obtained by chromatography on silica gel with hexane and diethyl ether (8:2 parts by volume). A sample is distilled in a bulb tube boiling point approximately 70–80°/0.005 mm. Hg; $n_D^{20}$: 1.4480.

EXAMPLE 2

9.6 sodium hydride (50% Nujol suspension) are washed twice with hexane and covered with a layer of 40 ml. absolute tetrahydrofuran. 25.6 g. 6-methyl-5-hepten-2-ol in 40 ml. absolute tetrahydrofuran are added dropwise with cooling in an ice bath. The mixture is stirred for 1 hour at room temperature. 21.5 g. propargyl bromide, followed by 50 ml. hexamethylphosphoric triamide, are added dropwise with ice cooling; the mixture is stirred for 1 hour at 50°. The cooled reaction mixture is poured into a saturated aqueous sodium chloride solution, extracted with diethyl ether, washed with saturated aqueous sodium chloride solution, dried over sodium sulfate, filtered and evaporated. (1,5-dimethyl-4-hexenyl)-2-propynyl ether is obtained by chromatography on silica gel with hexane and diethyl ether (9:1 parts by volume). A sample is distilled in a bulb tube; boiling point approximately 110°/11 mm. Hg; $n_D^{20}$: 1.4500.

EXAMPLE 3

14.7 g. (3,7-dimethyl - 2 - cis/trans, 6-octadienyl)-2-propynyl ether are dissolved in 250 ml. methylene chloride. This solution is cooled on ice while 17.5 g. m-chloroperbenzoic acid (79% by weight) are added portionwise over a period of 40 minutes; stirring of the mixture is continued for 30 minutes with cooling. The mixture is diluted with 500 ml. diethyl ether and processed as described in Example 1. Chromatography on silica gel with hexane and diethyl ether (8:2 parts by volume) yields 6,7-epoxy - 3,7 - dimethyl-1-(2-propyloxy)-2-cis/trans octene. A sample is distilled in a bulb tube; melting point approximately 94–96°/0.002 mm. Hg; $n_D^{20}$: 1.4712.

EXAMPLE 4

10.5 g. sodium hydride (50% Nujol suspension) are washed twice with 100 ml. hexane each, to remove the Nujol. The sodium hydride is covered with a layer of 100 ml. absolute tetrahydrofuran, and 12.2 g. propargyl alcohol are added dropwise while cooling with ice. The mixture is stirred for 1 hour at room temperature; then, 25 g. geranyl bromide are added dropwise while again cooling with ice. Immediately upon completion of the addition of geranyl bromide 70 ml. hexylmethylphosphoric triamide are added dropwise and the mixture is stirred for 2 hours at room temperature. The reaction mixture is poured into a saturated aqueous sodium chloride solution, extracted with diethyl ether, washed with saturated aqueous sodium chloride solution, dried over sodium sulfate, filtered and evaporated. (3,7 - dimethyl - 2-cis/trans, 6-octadienyl)-2-propynyl ether is obtained by chromatography on silica gel with hexane and diethyl ether (9:1 parts by volume) and subsequent distillation. Boiling point: 62–64°/0.1 mm. Hg; $n_D^{20}$: 1.4763.

EXAMPLE 5

44.3 g. N-bromosuccinimide are added within 10 minutes in portions to a homogeneous solution of 57.6 g. 2-propynyl - (3,7,11 - trimethyl - 2-cis/trans, 6-cis, 10-dodecatrienyl) ether in 664 ml. absolute tetrahydrofuran and 103 ml. water while cooling with ice; the mixture is stirred for 6 hours on an ice bath (internal temperature 1–3°). The mixture is poured on saturated aqueous sodium chloride solution and processed as described in Example 2. 3-brom-2,6,10 - trimethyl - 12-(2-propynyloxy)-6-cis, 10-cis/trans dodecadien-2-ol is obtained by chromatography on silica gel with hexane and diethyl ether (7:3 parts by volume). A sample can be distilled without decomposition in a bulb tube. Boiling point approximately 137–142°/0.002 mm. Hg; $n_D^{20}$: 1.5097.

EXAMPLE 6

19.5 g. sodium hydride (50% Nujol suspension) are washed twice with 200 ml. hexane each and covered with a layer of 200 ml. absolute tetrahydrofuran while cooling with ice, 23.5 g. propargyl alcohol are added dropwise within 30 minutes. The mixture is stirred for 1 hour at room temperature. To this solution, 100 g. 2-cis/trans, 6-cis farnesyl bromide are added dropwise, followed by the dropwise addition of 140 ml. hexamethylphosphoric triamide with cooling on ice. The solution is stirred for 2 hours at room temperature, poured on an aqueous sodium chloride solution and processed as described in Example 4. Chromatography on silica gel with hexane and diethyl ether (9:1 parts by volume) yields 2-propynyl-(3,7,11-trimethyl-2-cis/trans, 6-cis, 10-dodecatrienyl) ether. A sample can be distilled in a bulb tube. Boiling point approximately 98°/0.002 mm. Hg; $n_D^{20}$: 1.4877.

EXAMPLE 7

A solution of 2.52 g. sodium in 50 ml. absolute methanol is added dropwise within 10 minutes to 38 g. 3-bromo-2,6,10 - trimethyl - 12-(2-propynyloxy)-6-cis, 10-cis/trans dodecadien-2-ol in 250 ml. methyl alcohol with cooling on ice; the mixture is stirred for 1.5 hours with cooling on the ice bath and poured on saturated aqueous sodium chloride solution. Further processing was carried out according to Example 4. Chromatography on silica gel with hexane and diethyl ether (8:2 parts by volume) yields 10,11 - epoxy - 3,7,11-trimethyl-1-(2-propynyloxy)-2-cis/trans, 6-cis dodecadien. A sample is distilled in a bulb tube. Boiling point approximately 125–130°/0.001 mm. Hg; $n_D^{20}$: 1.4833.

EXAMPLE 8

2.4 g. sodium hydride (50% Nujol suspension) are washed twice with 50 ml. portions of hexane and covered with a layer of 10 ml. absolute tetrahydrofuran. 11.9 g. 2-cis/trans, 6-cis-10,11-epoxyfarnesol are dissolved in 10 ml. tetrahydrofuran and added dropwise. The reaction mixture is stirred for 1 hour at room temperature. Subsequently, 7 g. propargyl bromide is added dropwise with cooling on ice, followed by the dropwise addition of 20 ml. hexamethylphosphoric triamide, also while cooling with ice. The mixture is then stirred for 3 hours at room temperature. The mixture is poured on saturated aqueous sodium chloride solution and processed as described in Example 4. Chromatography on silica gel with hexane and diethyl ether (8:2 parts by volume) yields 10,11-epoxy-3,7,11 - trimethyl - 1 - (2-propynyloxy)-2-cis/trans, 6-cis dodecadiene. A sample is distilled in a bulb tube. Boiling point approximately 125–130°/0.001 mm. Hg; $n_D^{20}$: 1.4833.

EXAMPLE 9

A solution of 14.25 g. 2-cis/trans, 6-cis-farnesyl bromide in 150 ml. methylene chloride is cooled to 0° while 12.5 g. of m-chloroperbenzoic acid (79% by weight) is added in portions. The mixture is stirred for 30 minutes while cooled on ice, diluted with 500 ml. diethyl ether, washed with ice cold 1 N aqueous sodium hydroxide solution followed by saturated aqueous sodium chloride solution, dried over sodium sulfate and evaporated in a rotating evaporator at 25°. The residue is taken up in 15 ml. absolute tetrahydrofuran and added dropwise to a suspension of sodium propargylate (prepared from 2.8 g. propargyl alcohol and 2.4 g. sodium hydride) in 25 ml. absolute tetrahydrofuran with cooling on ice. Subsequently, 20 ml. hexamethylphosphoric triamide are added dropwise while the temperature is maintained below 20° with intermittent ice cooling; the reaction mixture is stirred for 3 hours at room temperature, poured on a saturated aqueous sodium chloride solution and processed as described in Example 4. Chromatography on silica gel with hexane and diethyl ether (8:2 parts by volume and 8.5:1.5 parts by volume) yields 10,11-epoxy-3,7,11-trimethyl-1-(2-propynyloxy)-2-cis/trans, 6-cis dodecadiene as product. 6,7-epoxy-3,7,11-trimethyl-6.7-cis-1(2-propynyloxy)-2-cis/trans, 10-dodecadiene is also formed and 2,3-epoxy-3,7,11-trimethyl-2,3-cis/trans-1-(2-propynyloxy)-6-cis, 10-dodecadiene as well as other peroxidized byproducts can be separated from this compound by repeated chromatography. A sample of the product distilled in a bulb tube boils at approximately 125–130°/0.001 mm. Hg; $n_D^{20}$: 1.4833.

EXAMPLE 10

31.5 g. N-bromosuccinimide are added within 15 minutes in portions to 39 g. 2-propynyl-(3,7,11-trimethyl-2,6,10-dodecatrienyl) ether (cis/trans mixture) in 437.5 ml. tetrahydrofuran and 62.5 ml. water with stirring and cooling in an ice bath. The mixture is stirred for 5 hours at this temperature, poured on saturated aqueous sodium chloride solution and processed as described in Example 4. Chromatography on silica gel with hexane and diethyl ether (7:3 parts by volume) yields 3-bromo-2,6,10-trimethyl - 12 - (2 - propyinyloxy)-6,10-dodecadien-2-ol. A sample distilled in a bulb tube boils without decomposition at 135–140°/0.001 mm. Hg; $n_D^{20}$: 1.5099.

EXAMPLE 11

19.5 g. sodium hydride (50% Nujol suspension) are washed twice with 200 ml. portions of hexane and covered with a layer of 200 ml. absolute tetrahydrofuran. 23.5 g. propargyl alcohol are added while cooling with ice; the mixture is stirred for 1 hour at room temperature. Then, 100 g. cis/trans farnesyl bromide and 140 ml. hexylmethylphosphoric triamide are added dropwise in this order with intermittent cooling with ice. The mixture is stirred for 2 hours at 50° and processed as described in Example 4. Chromatography on silica gel with hexane and diethyl ether (95:5 parts by volume) and subsequent distillation yield 2 - propynyl - (3,7,11-trimethyl-2,6,10-dodecatrienyl ether. Boiling point 94°/0.008 mm. Hg; $n_D^{20}$: 1.4880.

EXAMPLE 12

A solution of 2.1 g. sodium in 80 ml. absolute methanol is added dropwise to 32.3 g. 3-bromo-2,6,10-trimethyl-12-(2-propynyloxy) - 6,10 - dodecadien - 2 - ol in 200 ml. absolute methanol cooled on ice. The mixture is stirred for 30 minutes, poured on saturated aqueous sodium chloride solution and processed as described in Example 2. Chromatography on silica gel with hexane and diethyl ether (8:2) yields 10,11 - epoxy - 3,7,11-trimethyl-1-(2-propynyloxy) - 2,6 - dodecadiene. A sample is distilled in a bulb tube. Boiling point approximately 130°/0.001 mm. Hg; $n_D^{20}$: 1.4840.

EXAMPLE 13

11.5 g. of m-chloroperbenzoic acid (79% by weight) are added in portions to 13 g. 2-propionyl-(3,7,11-trimethyl - 2,6,10-dodecatrienyl) ether in 130 ml. methylene chloride at 0°; stirring is continued for 2 hours at 0°. The mixture is diluted with 500 ml. diethyl ether and processed as described in Example 1. Chromatography on silica gel with hexane and diethyl ether (8:2 parts by volume) yields 10,11 - epoxy - 3,7,11-trimethyl-1-(2-propynyloxy)- 2,6 - dodecadiene and 6,7 - epoxy - 3,7,11-trimethyl-1-(2-propynyloxy) - 2,10 - dodecadiene. A sample is distilled in the bulb tube. Boiling point approximately 125–130°/ 0.001 mm. Hg; $n_D^{20}$: 1.4838.

The mixture consisting of 10,11 - epoxy - 3,7,11-trimethyl - 1 - (2 - propynyloxy) - 2,6-dodecadiene and 6,7-epoxy - 3,7,11 - trimethyl - 1 - (2-propynyloxy)-2,10-dodecadiene can be separated by chromatography on suitable adsorbants, by fractional distillation or preparative gas chromatography, if desired.

EXAMPLE 14

1.5 g. sodium hydride (50% Nujol suspension) are washed twice with 10 ml. portions of hexane and covered with a layer of 10 ml. absolute tetrahydrofuran. 8 g. 10,11-epoxy - 3,7,11 - trimethyl - 2,6 - tridecadien-1-ol are added dropwise to this mixture in such a manner that the temperature does not exceed 30°. The mixture is stirred for 1 hour at room temperature. Then, 4.2 g. propargyl bromide and, with ice cooling, 12 ml. hexamethylphosphoric triamide are added dropwise in this order; stirring is continued for 2.5 hours at 50°. The mixture is poured on saturated aqueous sodium chloride solution and processed as described in Example 4. Chromatography on silica gel with hexane and ether (8:2 parts by volume) and distillation under high vacuum yield 10,11-epoxy-3,7,11-trimethyl - 1 - (2 - propynyloxy)-2,6-tridecadiene. Boiling point 113–116°/0.001 mm. Hg; $n_D^{20}$: 1.4846.

EXAMPLE 15

10,11 - epoxy - 7 - ethyl - 3,11-dimethyl-2,6-tridecadien-1-ol is converted to 10,11 - epoxy - 7 - ethyl - 3,11-dimethyl - 1 - (2-propynyloxy) - 2,6 - tridecadiene can be the procedure given in Example 14.

EXAMPLE 16

2.5 g. sodium hydride (50% Nujol suspension) are washed twice with 20 ml. portions of hexane and covered with a layer of 17 ml. absolute tetrahydrofuran. 13.4 g. 10,11 - epoxy - 3,7,10,11 - tetramethyl - 2,6-dodecadien-1-ol are added dropwise to this mixture at 23–28° and during a period of 10 minutes; the reaction mixture is stirred for 1 hour at room temperature. Then, 7.2 g. propargyl bromide and 20 ml. hexamethylphosphoric triamide are added dropwise in this order with occasional cooling on ice. The reaction mixture is stirred for 1.5 hour hours at 60°, poured onto an aqueous sodium chloride solution and processed as described in Example 4. Chromatography on silica gel with hexane and dithyel ether (7:3 parts by volume) and distillation under vacuum yield 10,11 - epoxy-3,7,10,11-tetramethyl-1-(2-propynyloxy)-2,6-dodecadiene with a boiling point of 113°/0.008 mm. Hg; $n_D^{20}$: 1.4851.

EXAMPLE 17

66.3 ml. of a 71.3% by weight of a solution of sodium dihydro-bis (2-methoxy ethoxy) aluminate in benzene are added dropwise within 1 hour and with cooling on ice to 65 g. 3,7,10,11-tetramethyl-2,6,10-dodecatrienoic acid ethyl ester in 270 ml. absolute benzene. This mixture is reacted with 250 ml. water while cooling with ice, poured on saturated aqueous sodium chloride solution, extracted with benzene and processed as in Example 4. Distillation yields 3,7,10,11-tetramethyl-2,6,10-dodecatrien-1-ol with a boiling point of 92–93°/0.02 mm. Hg; $n_D^{20}$: 1.4946.

EXAMPLE 18

22.6 g. of m-chloroperbenzoic acid (79% by weight) is added in portions to 23.6 g. 3,7,10,11-tetramethyl-2,6,10-dodecatrien-1-ol in 500 ml. methylene chloride with cooling to 0°. The mixture is stirred for 2 hours at 0°, diluted with 1,000 ml. methylene chloride and processed as described in Example 1. Chromatography on silica gel with hexane and diethyl ether (1:1 part by volume) yields 10,11 - epoxy-3,7,10,11-tetramethyl-2,6-dodecadien-1-ol. Boiling point 104–107°/0.02 mm. Hg; $n_D^{20}$: 1.4867.

EXAMPLE 19

9.45 g. of m-chloroperbenzoic acid (79% by weight) are added in portions at 0° to 8.4 g. 3,7,11-trimethyl-2-cis/trans, 6-trans, 10-dodecatrienoic acid-2-propinyl ester in 120 ml. methylene chloride. The mixture is stirred at 0° for 1.5 hours, diluted with 200 ml. methylene chloride and processed as described in Example 1. Chromatography on silical gel with hexane and diethyl ether (8:2 parts by volume) yields 10,11-epoxy-3,7,11-trimethyl-2-cis/trans, 6-trans, dodecadienoic acid-2-propinyl ester. A sample is distilled in a bulb tube. Boiling point approximately 130°/0.0001 mm. Hg; $n_D^{20}$: 1.4914.

EXAMPLE 20

3,7,11-trimethyl-2,6,10-tridecatrienoic acid - 2-propinylester is converted to 10,11-epoxy-3,7,11-trimethyl-2,6-tridecadienoic acid - 2 - propinyl ester, and 3,7,10,11-tetramethyl - 2,6,10 - dodecatrienoic acid-2-propinyl ester is converted to 10,11 - epoxy-3,7,10,11-tetramethyl-2,6-dodecadienoic acid-2-propinyl ester by the procedure given in Example 19.

EXAMPLE 21

At 0°, 7.35 ml. thionyl chloride are added dropwise to 23.6 g. 3,7,11-trimethyl-2-cis/trans, 6-trans, 10-dodecatrienoic acid dissolved in 100 ml. absolute ether and 8.15 ml. absolute pyridine. The mixture is stirred for 1 hour at room temperature and the precipitated pyridine hydrochloride is filtered with a filtering aid in the absence of moisture. The residue on the filter is washed with hexane. The filtrate is evaporated under vacuum at 30°, the residue is taken up in 70 ml. absolute benzene and added dropwise with cooling on ice to a solution of 5.6 g. propargyl alcohol, 8.15 ml. absolute pyridine, 55 ml. benzene and 200 ml. hexane. The mixture is stirred for 1 hour at room temperature, diluted with 200 ml. diethyl ether, washed with ice cold dilute hydrochloric acid, sodium bicarbonate and saturated aqueous sodium chloride solution in this order, dried over sodium sulfate and evaporated. Chromatography on silica gel with hexane and diethyl ether (8:2 parts by volume) and distillation under high vacuum yield 3,7,11-trimethyl-2-cis/trans, 6-trans, 10-dodecatrienoic acid-2-propinyl ester. Boiling point 94°–95°/0.002 mm. Hg, $n_D^{20}$: 1.4952.

EXAMPLE 22

17.3 g. sodium hydride (50% Nujol suspension) are washed twice 100 ml. portions of hexane and covered with a layer of 175 ml. absolute tetrahydrofuran. 59.5 g. diphenylphosphonoacetic acid-2-propinyl ester are added dropwise and with ice cooling so that the reaction temperature is maintained below 10°. The mixture is stirred for one hour at room temperature. Then, 35 g. 6,10-dimethyl undeca-5-trans, 9-dien-2-one are added dropwise with ice cooling so that the temperature of the mixture does not exceed 20°. The mixture is stirred for 16 hours at room temperature; 20 ml. propargyl alcohol are added dropwise with ice cooling to destroy excess sodium hydride. The mixture is poured on saturated aqueous sodium chloride solution and extracted with hexane. The combined hexane extracts are washed with saturated aqueous sodium chloride solution, dried over sodium sulfate and evaporated. Fractional distillation under high vacuum yields 3,7,11 - trimethyl - 2 - cis/trans, 6-trans, 10-dodecatrienoic acid-2-propinyl ester. Boiling point 95–97°/ 0.002 mm. Hg; $n_D^{20}$: 1.4952.

EXAMPLE 23

9.6 g. sodium hydride (50% Nujol suspension) are washed twice with 50 ml. portions of hexane and covered with a layer of 100 ml. absolute tetrahydrofuran. 33 g. 2-propinyloxy carbonyl-methyl diphenylphosphonate are added dropwise and with ice cooling so that the temperature of the mixture is maintained below 10°. The mixture is stirred for 1 hour at room temperature; 21 g. 9,10-epoxy - 6,10 - dimethyl - undec - 5-trans-en-2-one are added dropwise and with ice cooling to keep the temperature of the reaction mixture below 20°. The mixture is stirred for 16 hours at room temperature; 10 ml. propargyl alcohol are added dropwise with ice cooling to destroy excess sodium hydride. The reaction mixture is cautiously evaporated under vacuum, poured on saturated aqueous sodium chloride solution and processed as described in Example 4. Fractional distillation under high vacuum yields 10,11-epoxy-3,7,11-trimethyl-2-cis/trans, 6-trans, dodecadienoic acid-2-propinyl ester. Boiling point of a sample distilled in a bulb tube, approximately 130°/ 0.001 mm. Hg; $n_D^{20}$: 1.4914.

EXAMPLE 24

3.5 g. of m-chloroperbenzoic acid (79% by weight) are added portionwise at 0° to 4.5 g. 7-ethyl-3,11-dimethyl-2,6-tridecadienoic acid-2,-propionyl ester in 80 ml. methylene chloride. The mixture is stirred for 1.5 hours at 0°, diluted with 300 ml. ether and processed as described in Example 1. Chromatography on silica gel with hexane and ether (75:25 parts by volume) permits the separation of unreacted starting material as well as isomeric 6,7-epoxy-ester and diepoxidated ester. 10,11-epoxy-7-ethyl-3,11-dimethyl-2,6-tridecadienoic acid-2-propinyl ester is obtained. A sample distilled in a bulb tube boils at approximately 130°/0.001 mm. Hg; $n_D^{20}$: 1.4896.

EXAMPLE 25

3.8 ml. thionyl chloride are added dropwise at 0° to 11.9 g. 7-ethyl-3,11-dimethyl-2,6,10-tridecatrienoic acid (cis/trans mixture) in 60 ml. absolute diethyl ether and 4.1 ml. absolute pyridine. The mixture is stirred for 1 hour at room temperature and the precipitated pyridine hydrochloride is filtered with a filtering aid and in the absence of moisture. The residue is washed with hexane. The filtrate is concentrated at 30° under vacuum and the residue is taken up in 50 ml. absolute benzene. This benzene solution is added dropwise with ice cooling to a mixture of 3.2 g. propargyl alcohol, 4.1 ml. pyridine, 30 ml. absolute benzene and 70 ml. hexane. The mixture is stirred for 1 hour at room temperature, diluted with 200 ml. diethyl ether, washed with ice cold dilute hydrochloric acid, sodium bicarbonate solution and an aqueous sodium chloride solution in this order, dried over sodium sulfate, filtered and evaporated. Chromatography on silica gel with hexane and diethyl ether (75:25 parts by volume) and subsequent distillation under high vacuum yields 7-ethyl-3,11-dimethyl-2,6,10-tridecatrienoic acid-2-propionyl ester with a boiling point of 100–103°/0.001 mm. Hg; $n_D^{20}$: 1.4942.

EXAMPLE 26

10 g. of m-chloroperbenzoic acid (79% by weight) are added in portions at 0° to 8.5 g. 3,7-dimethyl-2-cis/trans, 6-octadienoic acid-2-propynyl ester in 100 ml. methylene chloride. The mixture is stirred for 2 hours at 0°, diluted with 350 ml. diethyl ether and processed as described in Example 1. Chromatography on silica gel with hexane and diethyl ether (8:2 parts by volume) and subsequent distillation under high vacuum yield 6,7-epoxy-3,7-dimethyl-2-cis/trans octenoic acid-2-propionyl ester. Boiling point: 74°/0.001 mm. Hg; $n_D^{20}$: 1.4822.

EXAMPLE 27

6,7-epoxy-3,7-dimethyl-2-nonenoic acid-2-propynyl ester is prepared from 3,7-dimethyl-2,6-nonadienoic acid-2-propynyl ester, and the 6,7-epoxy-3-ethyl-7-methyl-2-nonenoic acid-2-propynyl ester is prepared from 3-ethyl-7-methyl-2,6-nonadienoic acid-2-propynyl ester by the procedure of Example 26.

EXAMPLE 28

Over a period of 20 minutes, 12.3 ml. thionyl chloride are added dropwise with ice cooling to a mixture of 25.2 g. geranic acid, 13.8 ml. absolute pyridine and 150 ml. absolute diethyl ether; the mixture is stirred for 1 hour at room temperature. The precipitated pyridine hydrochloride is filtered with a filtering aid in the absence of moisture, the filter residue is washed with hexane and the filtrate is evaporated. The residue (crude geranic acid chloride 27 g.) is taken up in 100 ml. benzene and added dropwise to an ice cold solution of 80 ml. absolute benzene, 9 g. propargyl alcohol, 13.8 ml. pyridine and 200 ml. hexane. The mixture is stirred for 1 hour at room temperature, poured into ice cold dilute hydrochloric acid, extracted with diethyl ether and processed as described in Example 4. Chromatography on silica gel with hexane and diethyl ether (9:1 parts by volume) yields 3,7-dimethyl-2-cis/trans, 6-octadienoic acid-2-propynyl ester. A sample is distilled in a bulb tube and has a boiling point of approximately 70°/0.001 mm. Hg; $n_D^{20}$: 1.4878.

EXAMPLE 29

6 g. of m-chloroperbenzoic acid are added portionwise stirring at 0° to 5.55 g. (3,7-dimethyl-2-cis/trans,6-octadienyl)-1,1-dimethyl-2-propynyl ether in 60 ml. methylene chloride. The mixture is stirred for 2 hours at 0°, diluted with 300 ml. diethyl ether and processed as described in Example 1. Chromatography on silica gel with hexane and diethyl ether (4:1 parts by volume) yields 6,7-epoxy-3,7-dimethyl-1-(1,1-dimethyl-2-propynyloxy) - 2 - cis/trans-octene. A sample is distilled in a bulb tube and has a boiling point of approximately 80–90°/0.02 mm. Hg; $n_D^{20}$: 1.4636.

EXAMPLE 30

5.2 g. sodium hydride (50% Nujol suspension) are washed twice with 20 ml. portions of hexane and covered with a layer of 20 ml. absolute tetrahydrofuran. 9.25 g. 2-methyl-3-butin-2-ol in 20 ml. tetrahydrofuran are added dropwise with ice cooling. The mixture is stirred for 1 hour at room temperature; 21.7 g. geranyl bromide and 40 ml. hexamethylphosphoric triamide are added dropwise in this order with renewed ice cooling. The mixture is refluxed for 3 hours. After cooling, it is poured on saturated aqueous sodium chloride solution and extracted with diethyl ether. The combined ether solutions are washed with saturated aqueous sodium chloride solution, dried over sodium sulfate, filtered and evaporated. Fractional distillation under high vacuum yields (3.7-dimethyl-2-cis/trans, 6-octadienyl)-(1,1-dimethyl - 2 - propynyl) ether. Boiling points 64–65°/0.09 mm. Hg; $n_D^{20}$: 1.4682.

EXAMPLE 31

4.3 g. 6,7-epoxy-3,7-dimethyl-2-cis/trans octenoic acid-2-propinyl ester are added dropwise with vigorous stirring at 0° within a period of 30 minutes to a suspension of 1.48 g. thiourea in 9.8 ml. 2 N sulfuric acid. The mixture is stirred for 2 hours at 0° and 1 hour at room temperature; then, a solution of 1.05 g. sodium carbonate in 4 ml. water is added dropwise with ice cooling, followed by stirring for 1 hour at room temperature. The mixture is poured on aqueous sodium chloride solution and processed as described in Example 4. The viscous crude product is chromatographed with hexane and diethyl ether (4:1 parts by volume) on silica gel. A sample of the 6,7-epithio-3,7-dimethyl - 2 - cis/trans-octenoic acid 2-propynyl etser is distilled in a bulb tube. The boiling point is approximately 85°/0.005 mm. Hg; $n_D^{20}$: 1.5168.

EXAMPLE 32

By the procedure given in Example 31:

6,7 - epoxy - 3,7-dimethyl-2-nonenoic acid-2-propynylester is converted to 6,7-epithio-3,7-dimethyl-2-nonenoic acid-2-propynylester;

6,7, - epoxy - 3 - ethyl,7 - methyl-2-nonenoic acid-2-propynylester is converted to 6,7-epithio-3-ethyl,7-methyl-2-nonenoic acid-2-propylnylester;

10,11 - epoxy - 3,7,11 - trimethyl-2,6-dodecadienoic acid-2-propynylester is converted to 10,11-epithio-3,7,11-trimethyl-2,6-dodecadienoic acid-2-propynylester;

10,11 - epoxy - 3,7,10,11 - tetramethyl - 2,6-dodecadienoic acid-2-propynylester is converted to 10,11-epithio - 3,7,10,11 - tetramethyl-2,6-dodecadienoic acid-2-propynylester;

10,11 - epoxy - 3,7,11-trimethyl-2,6-tridecadienoic acid-2-propynylester is converted to 10,11-epithio-3,7,11-trimethyl-2,6-tridecadienoic acid-2-propynylester;

10,11 - epoxy - 7 - ethyl - 3,11-dimethyl-2,6-tridecadienoic acid-2-propynylester is converted to 10,11-epithio - 7 - ethyl - 3, 11 - dimethyl-2,6-tridecadienoic acid-2-propynylester;

6,7 - epoxy - 3,7-dimethyl-1-(2-propynyloxy)-2-octene is converted to 6,7-epithio-3,7-dimethyl-1-(2-propynyloxy)-2-octene;

6,7 - epoxy - 3,7-dimethyl-1-(2-propynyloxy)-2-nonene is converted to 6,7-epithio-3,7-dimethyl-1-(2-propynyloxy)-2-nonene;

6,7 - epoxy - 3 - ethyl-7-methyl-1-(2-propynyloxy)-2-nonene is converted to 6,7-epithio-3-ethyl-7-methyl-1-(2-propynyloxy)-2-nonene;

6,7 - epoxy - 3,7 - dimethyl-1-(1,1-dimethyl-2-propynyloxy) - 2 - octene is converted to 6,7-epithio-3,7-dimethyl-1-(1,1-dimethyl-2-propynyloxy)-2-octene;

10,11 - epoxy - 3,7,11 - trimethyl-1-(2-propynyloxy)-2,6-dodecadiene is converted to 10,11-epithio-3,7,11-trimethyl-1-(2-propynyloxy)-2,6 dodecadiene;

10,11 - epoxy - 3,7,11 - trimethyl-1-(2-propylnyloxy)-2,6-tridecadiene is converted to 10,11-epithio-3,7,11-trimethyl-1(2-propynyloxy)-2,6-tridecadiene;

10,11 - epoxy - 7 - ethyl-3,11-dimethyl-1-(2-propynyloxy)-2,6-tridecadiene is converted to 10,11-epithio-7-ethyl - 3,11 - dimethyl-1-(2-propnyloxy)-2,6-tridecadiene; and 10,11 - epoxy - 3,7,10,11 - tetramethyl-1-(2-propynyloxy)-2,6-dodecadiene is converted to 10,11-epithio-3,7,10,11-tetrametyl-1-(2-propynyloxy)-2,6-dodecadiene.

EXAMPLE 33

7.3 g. of 3,7,11-trimethyl-2-cis/tran,6-cis,10-dodecatrienyl(4-phenoxy-2-butinyl) ether are dissolved in 80 ml. of methylene chloride. With ice-cooling, 4.41 g. of m-chloroperbenzoic acid (93%) are added portionwise to this solution and the mixture is further stirred for 1 hour with ice-cooling. The mixture is then diluted with 160 ml. of diethyl ether, washed, dried and evaporated in the manner described in Example 1. Chromatography on kieselgel with hexane/diethyl ether (4:1 parts by volume) yields 10,11 - epoxy - 3,7,11-trimethyl-2-cis/trans, 6-cis-dodecadienyl(4-phenoxy-2-butinyl)ether. A sample is distilled in the bulb-tube. Boiling point ca. 200°/0.004 mm. Hg; $n_D^{20}$: 1.5218.

EXAMPLE 34

1.41 g. of sodium hydride (50% Nujol suspension) are washed twice with 20 ml. of hexane to remove the Nujol. The sodium hydride is overlaid with 20 ml. of absolute tetrahydrofuran and 5 g. of 4-phenoxy-2-butin-1-ol are thereafter added dropwise with ice-cooling. The mixture is stirred at room temperature for an hour and subsequently treated dropwise, with renewed ice-cooling, with 1-bromo-3,7,11-trimethyl-2-cis/trans, 6-cis, 10-dodecatrien. Immediately after completion of the addition of 1-bromo-3,7,11-trimethyl-2-cis/trans, 6-cis, 10-dodecatrien, 7 ml. of hexamethyl phosphoric acid triamide are added dropwise and the mixture stirred at room temperature for a further 3 hours. For the working up, it is poured onto an aqueous saturated sodium chloride solution, exhaustively extracted with diethyl ether, the extract washed with aqueous saturated sodium chloride solution, dried over sodium sulfate, filtered and evaporated. By chromatography on kieselgel with hexane/diethyl ether (95:5 parts by volume) and subsequent distillation there is obtained 3,7,11-trimethyl-2-cis/trans, 6-cis, 10-dodecatrienyl (4-phenoxy-2-butinyl) ether. Boiling point: ca. 190–195°/0.001 mm. Hg; $n_D^{20}$: 1.5262.

EXAMPLE 35

3,7-dimethyl-2-cis/trans, 6-octadienoic acid (4-phenoxy-2-butinyl) ester is dissolved in 40 ml. of methylene chloride. With ice-cooling, 2.5 g. of m-chloroperbenzoic acid (93%) are added portionwise to this solution and the mixture is further stirred for 60 minutes with ice-cooling. The mixture is diluted with 80 ml. of diethyl ether, washed, dried and evaporated as in Example 1. Chromatography on kieselgel with hexane/diethyl ether (1:1 parts by volume) yields 6,7-epoxy-3,7-dimethyl-2-cis/trans-octenoic acid (4-phenoxy-2-butinyl) ester. A sample is distilled in the bulb-tube. Boiling point: ca. 135°/0.001 mm. Hg; $n_D^{20}$: 1.5297.

EXAMPLE 36

2.6 ml. of thionyl chloride are added dropwise at 0° to 5.1 g. of 3,7-dimethyl-2-cis/trans, 6-octadienoic acid dissolved in 40 ml. of absolute diethyl ether and 2.92 ml. of absolute pyridine, the mixture is stirred at room temperature for an hour and thereafter the precipitated pyridine hydrochloride is filtered off with the exclusion of moisture and using a filter aid. The residue on the filter is washed out with hexane. The filtrate is concentrated in vacuum at 30°, the residue taken up in 10 ml. of absolute benzene and, with ice-cooling, added dropwise to a solution of 4.9 g. of 4-phenoxy-2-butin-1-ol and 2.92 ml. of absolute pyridine in 55 ml. of benzene. The mixture is stirred at room temperature for 3 hours, successively washed with ice-cold dilute hydrochloric acid, sodium bicarbonate and aqueous saturated sodium chloride solution, dried over sodium sulfate and evaporated. Chromatography on kieselgel with hexane/diethyl ether (7:3 parts by volume) yields 3,7-dimethyl-2-cis/trans, 6-octadienoic acid (4-phenoxy-2-butinyl) ester. Boiling point: ca. 125°/0.001 mm. Hg; $n_D^{20}$: 1.5254.

EXAMPLE 37

3.3 ml. of thionyl chloride are added dropwise at 0° to 9.45 g. of 3,7,11-trimethyl-2-cis/trans, 6-trans, 10-dodecatrienoic acid dissolved in 50 ml. of absolute diethyl ether and 3.6 ml. of absolute pyridine, the mixture is stirred at 0° for an hour and thereafter the precipitated pyridine hydrochloride is filtered off with the exclusion of moisture and using a filter aid. The filtrate is concentrated in vacuum at 30°, the residue taken up in 20 ml. of absolute benzene and, with ice-cooling, added dropwise to a solution of 5.0 g. of 6-methyl-5-hepten-2-in-1-ol, and 3.6 ml. of absolute pyridine in 100 ml. of absolute benzene. The mixture is stirred at room temperature for 3 hours, successively washed with ice-cold dilute hydrochloric acid, sodium bicarbonate and aqueous saturated sodium chloride solution, dried over sodium sulfate and evaporated. Chromatography on kieselgel with hexane/diethyl ether (9:1 parts by volume) and high vacuum distillation yields 3,7,11-trimethyl - 2 - cis/trans, 6-trans, 10-dodecatrienoic acid (6-methyl-5-hepten-2-inyl) ester. Boiling point: ca. 145°/0.001 mm. Hg; $n_D^{20}$: 1.5039.

EXAMPLE 38

1.94 g. of sodium hydride (50% Nujol suspension) are washed twice with 20 ml. of hexane to remove the Nujol. The sodium hydride is overlaid with 25 ml. of absolute tetrahydrofuran and 3.9 g. of 2,5-hexadiin-1-ol in 30 ml. of absolute tetrahydrofuran are thereafter added dropwise with ice-cooling. The mixture is stirred at room temperature for an hour and subsequently treated dropwise with 8.8 g. of 1-bromo-3,7-dimethyl-2-cis/trans, 6-octadien. Immediately after completion of the addition of 1-bromo-3,7-dimethyl-2-cis/trans, 6-octadien 10 ml. of hexamethyl phosphoric acid triamide are added dropwise and the mixture stirred at room temperature for a further 4 hours. For the working up, it is poured onto saturated aqueous sodium chloride solution, exhaustively extracted with diethyl ether, the extract washed with saturated aqueous sodium chloride solution, dried over sodium sulfate, filtered and evaporated. By chromatography on kieselgel with hexane/diethyl ether (9:1 parts by volume) there is obtained 3,7-dimethyl-2-cis/trans, 6-octadienyl(2,4-hexadiinyl) ether. Boiling point: ca. 145–150°/0.003 mm. Hg; $n_D^{20}$: 1.5157.

EXAMPLE 39

Ovicidal activity in Ephestia kühniella

Circles (10 cm.$^2$) of cotton material are sprinkled with a solution of active principle in acetone and dried carefully. For each substance and concentration 30–60 freshly layed eggs of the moth are placed on the circles and allowed to develop in a small plastic cage at 25° C. and high relative humidity until they hatch.

The activity of the substances is seen in the earlier or later death of the embryos in the eggs or upon hatching. The results are expressed in percent egg mortality.

The dosage is in $10^{-x}$ g. active principle/cm.$^2$ cotton. Thus, dosage 3 means $10^{-3}$ g./cm.$^2$.

| Preparation | Concentrate $10^{-x}$ g. act. subst./cm.$^2$ (dosage) | Egg mortality, in percent |
|---|---|---|
| 6,7-epoxy-3,7-dimethyl-1-(2-propynyloxy)-2-octene | 4 | 100 |
| | 5 | 100 |
| | 6 | 100 |
| | 7 | 88 |
| 10,11-epoxy-3,7,11-trimethyl-1-(2-propynyloxy)-2,6-tridecadiene | 4 | 100 |
| | 5 | 100 |
| | 6 | 100 |
| 10,11-epoxy-3,7,11-trimethyl-2-cis/trans, 6-trans-dodecadienoic acid 2-propynyl ester | 4 | 100 |
| | 5 | 100 |
| | 6 | 100 |
| 6,7-epoxy-3,7-dimethyl-2-cis/transoctenoic acid 2-propynyl ester | 4 | 100 |
| | 5 | 100 |
| | 6 | 100 |
| 10,11-epoxy-3,11-dimethyl-7-ethyl-2-cis/trans-6-cis/trans-tridecadienoic acid 2-propynyl ester | 4 | 100 |
| | 5 | 100 |
| | 6 | 100 |
| 3,7-dimethyl-1-(2-propynyloxy)-2-cis/trans, 6-cis/trans-octadiene | 4 | 100 |
| | 5 | 70 |
| 3,7,11-trimethyl-1-(2-propynyloxy)-2-cis/trans, 6-cis/trans, 10-dodecatriene | 4 | 100 |
| | 5 | 100 |
| | 6 | 87 |
| 3,7-dimethyl-2-cis/trans, 6-octadienoic acid 2-propynyl ester | 4 | 100 |
| | 5 | 100 |
| | 6 | 44 |
| 3,7,11-trimethyl-2-cis/trans, 6-cis/trans, 10-dodecatrienoic acid 2-propynyl ester | 4 | 100 |
| | 5 | 100 |
| | 6 | 100 |
| 3,11-dimethyl-7-ethyl-2-cis/trans, 6-cis/trans, 10-tridecatrienoic acid 2-propynyl ester | 4 | 100 |
| | 5 | 100 |
| | 6 | 64 |

NOTE.—Act. subst.=Preparation (active substance).

EXAMPLE 40

The following are solutions or emulsions which are dispersible in water for application by spraying to crops such as tomatoes, beans and cotton. In each of the below formulations, the active ingredient is 6,7-epoxy-3,7-dimethyl-1-(2-propynyloxy)-2-cis/transoctene. In the following formulations, all percents are given in weight.

| | Percent |
|---|---|
| Active substance | 30 |
| Tween 80 (polyoxyethylene (20) sorbitan monooleate) | 25 |
| Xylene | 45 |

| | |
|---|---|
| Active substance | 20 |
| Paraffin oil | 20 |
| Tween 80 | 30 |
| Xylene | 30 |

| | |
|---|---|
| Active substance | 20 |
| Castor oil | 20 |
| Tween 80 | 30 |
| Xylene | 30 |

| | |
|---|---|
| Active substance | 20 |
| Castor oil | 20 |
| Tween 80 | 30 |
| Acetone | 30 |

| | |
|---|---|
| Active substance | 20 |
| Santoquin (2,2,4-trimethyl-6-ethoxy-1,2-dihydroquinoline) | 2 |
| Paraffin oil | 20 |
| Tween 80 | 30 |
| Xylene | 28 |

| | |
|---|---|
| Active substance | 20 |
| Neobee M-5 (cocofat liquified by interesterification) | 20 |
| Tween 20 | 30 |
| Xylene | 30 |

| | |
|---|---|
| Active substance | 20 |
| Tween 80 | 30 |
| Dimethylsulfoxide | 20 |
| Xylene | 30 |

| | |
|---|---|
| Active substance | 20 |
| Deltyl extra (isopropylmyristate) | 20 |
| Tween 80 | 30 |
| Acetone | 30 |

| | |
|---|---|
| Active substance | 20 |
| Santoquin | 2 |
| Neobee M-5 | 78 |

| | |
|---|---|
| Active substance | 25 |
| Xylene | 65 |
| Atlox 2081 (a blend of polyoxyethylene sorbitan esters of fatty and resin acids with alkyl and aryl sulfonates) | 10 |

| | |
|---|---|
| Active substance | 25 |
| Xylene | 55 |
| Atlox 2081 | 10 |
| Paraffin oil | 10 |

| | |
|---|---|
| Active substance | 25 |
| Paraffin oil | 65 |
| Nonisol 210 (polyethyleneglycol ester of oleic acid) | 10 |

| | |
|---|---|
| Active substance | 25 |
| Xylene | 35 |
| Paraffin oil | 30 |
| Nonisol 210 | 10 |

| | |
|---|---|
| Active substance | 25 |
| Xylene | 35 |
| Paraffin oil | 30 |
| Tensiofix BS (mixture of anionic and nonionic emulsifiers) | 10 |

| | |
|---|---|
| Active substance | 25 |
| Paraffin oil | 65 |
| Tensiofix DJ [1] | 5 |
| Tensiofix EDS [1] | 5 |

See footnote at end of table.

|   | Percent |
|---|---|
| Active substance | 25 |
| Xylene | 35 |
| Paraffin oil | 30 |
| Emulsogen A (polyglycol ester of a fatty acid) | 10 |
| Active substance | 25 |
| Xylene | 62 |
| Paraffin oil | 10 |
| Damma resin | 3 |

[1] Mixture of anionic and nonionic emulsifiers.

EXAMPLE 41

The following is a powder which is dispersible in water for application by spraying to crops such as tomatoes, beans and cotton. In the formulation given below, the active ingredient is 6,7-epoxy-3,7-dimethyl-1-(2-propinyloxy)-2-cis/trans-octene. In the following formulation, all percents are given in weight.

|   | Percent |
|---|---|
| Active substance | 15 |
| Pluronic F68 (a condensation product of alkylene oxides with a hydrophobic base having a molecular weight of 1750; 80% by weight of the alkylene oxide groups consists of hydrophilic polyoxyethylene substituents and 20% by weight of hydrophobic polyoxypropylene substituents) | 85 |

What is claimed is:

1. A compound of the formula:

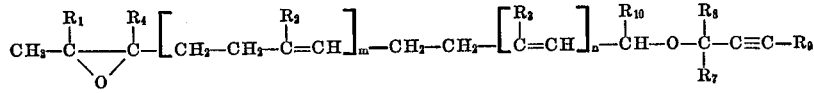

wherein $m$ and $n$ are integers from 0 to 1; $R_1$ is methyl or ethyl; $R_2$ and $R_3$ are hydrogen, methyl or ethyl; $R_4$ is hydrogen; and when $m$ and $n$ are 1 is hydrogen or methyl; $R_5$ and $R_6$ are hydrogen, and lower alkyl; $R_7$ and $R_8$ are hydrogen, methyl or ethyl; $R_9$ is hydrogen or lower alkyl; $R_{10}$ is hydrogen and when $m$ and $n$ are 0, hydrogen and methyl.

2. The compound of claim 1 wherein said compound is 2,3-epoxy-2-methyl-6-(2-propinyloxy)-heptane.

3. The compound of claim 1 wherein said compound is 6,7-epoxy-3,7-dimethyl-1-(2-propinyloxy)-2-octene.

4. The compound of claim 1 wherein said compound is 10,11-epoxy-3,7,11-trimethyl-1-(2-propinyloxy)-2,6-dodecadiene.

5. The compound of claim 1 wherein said compound is 10,11-epoxy-3,7,11-trimethyl-1-(2-propinyloxy)-2,6-tridecadiene.

6. The compound of claim 1 wherein said compound is 10,11-epoxy-3,7,10,11-tetramethyl-1-(2-propinyloxy)-2,6-dodecadiene.

No references cited.

NORMA S. MILESTONE, Primary Examiner

U.S. Cl. X.R.

260—240 H, 327 E, 348 A, 410 R, 410.9 N, 613 D, 614 R, 615 R; 424—275, 278, 312, 340, 341, 342, Dig. 12

UNITED STATES PATENT OFFICE
CERTIFICATE OF CORRECTION

Patent No. 3,773,797　　　　　　Dated　November 20, 1973

Inventor(s)　Madhukar Subraya Chodnekar, Albert Pffiffner, Norbert Rigassi, Ulrich Schwieter & Milos Suchy It is certified that error appears in the above-identified patent and that said Letters Patent are hereby corrected as shown below:

Column 1, line 2 - "title is missing" should be

Propargyl Ethers

Signed and sealed this 8th day of October 1974.

(SEAL)
Attest:

McCOY M. GIBSON JR.
Attesting Officer

C. MARSHALL DANN
Commissioner of Patents